(No Model.)

T. GUTHRIE & W. T. HALL.
CYCLE SADDLE.

No. 503,236. Patented Aug. 15, 1893.

Witnesses
J. A. Harvey.
E. W. Pattison.

Inventors
Thos Guthrie & W. T. Hall
by their attorney
A. Crawhall Chapman

UNITED STATES PATENT OFFICE.

THOMAS GUTHRIE AND WILLIAM THOS. HALL, OF SOUTH SHIELDS, ENGLAND.

CYCLE-SADDLE.

SPECIFICATION forming part of Letters Patent No. 503,236, dated August 15, 1893.

Application filed March 16, 1893. Serial No. 466,553. (No model.) Patented in England September 28, 1892, No. 17,280.

*To all whom it may concern:*

Be it known that we, THOMAS GUTHRIE and WILLIAM THOMAS HALL, subjects of the Queen of Great Britain and Ireland, and residents of South Shields, in the county of Durham, England, have invented certain Improvements in or Relating to Cycle-Saddles, (for which we have obtained a British patent, No. 17,280, dated September 28, 1892,) of which the following is a specification.

This invention refers to improvements in or relating to cycle saddles.

Our improvements refer specially to the constructional method adopted for the easy insertion and extraction of the internal air bag used for inflating saddles having ventilating openings in their centers.

Figure 2:
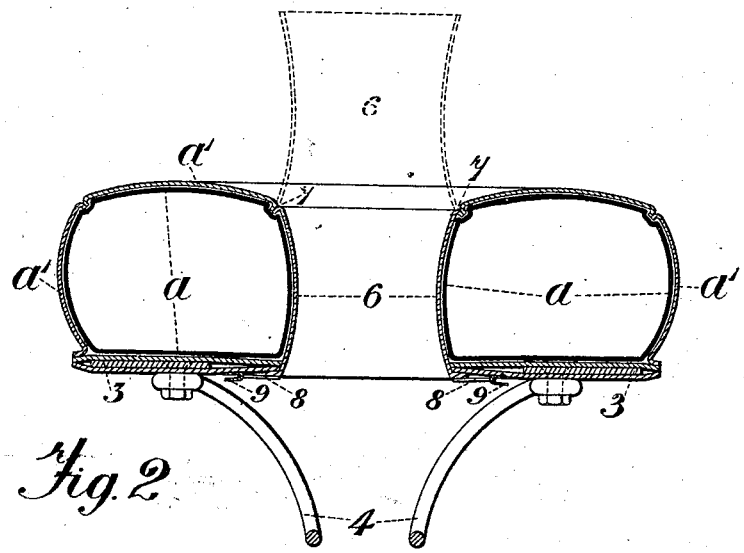
Figure 1:
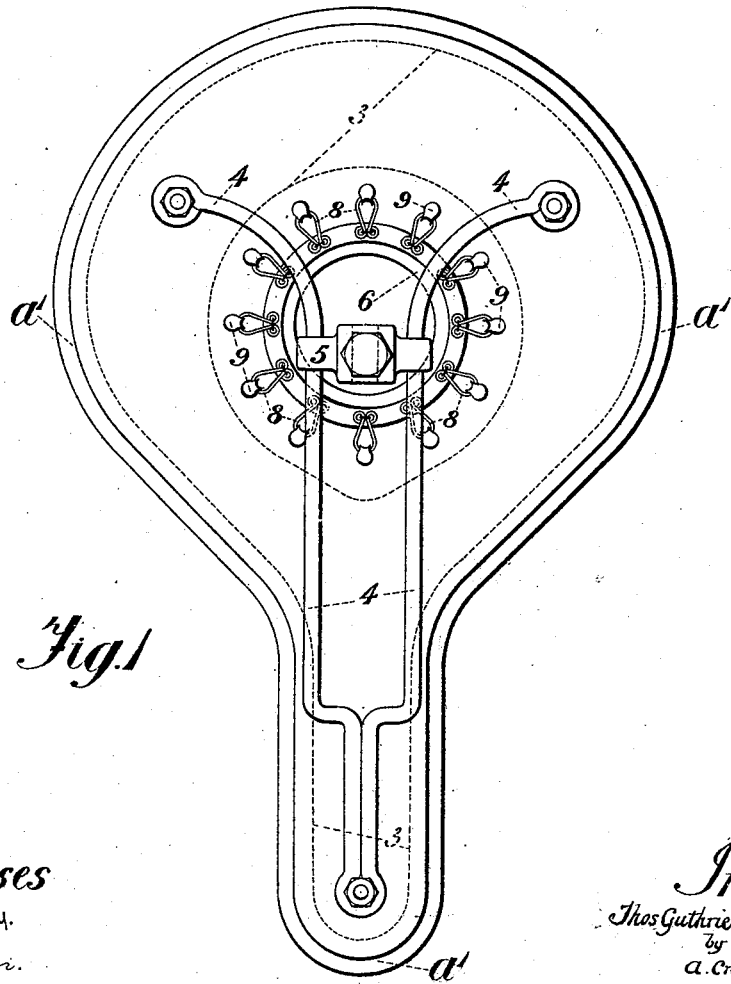

In Figures 1 and 2 accompanying this specification are shown respectively a plan of the under side of a saddle and a cross section through the ventilating opening in same, these figures being illustrative of our invention.

Referring to the drawings it will be seen that an internal india rubber air bag A formed with a central hole is used to inflate the external leather saddle casing A'. The latter has an iron plate framing 3 running all round its basal portion and arranged between the double thickness of leather provided in the saddle bottom. The weight of the rider is thus transmitted from this plate through the arms 4 to a central boss 5 which is designed to be secured to the machine framing in any convenient manner.

The leather tube or cylinder 6 forming the ventilating opening in the saddle is secured by stitching to the saddle casing at 7 and the opposite end of the cylinder is furnished with eyelets 8 adapted to be hooked onto the hooks 9 which are secured to the saddle casing as shown. Thus to take out the air bag, it is only necessary to release the contained air by opening the inflation valve: the saddle then collapses: the hooks can then be unhooked: the cylinder can then be pulled out as shown in dotted lines in Fig. 2 and the air bag removed through the opening thus formed. To replace the air bag, it is pushed through the opening caused by the removal of the leather cylinder into its position within the saddle casing: the leather cylinder is then pulled down into position and hooked to its hooks as shown in Fig. 1. The saddle can then be inflated to the shape shown in section in Fig. 2.

What we claim as our invention, and desire to secure by Letters Patent, is—

The combination with an air inflated cycle saddle of a leather tube or cylinder 6 secured at 7 to the saddle casing and having eyelets 8 adapted to be hooked or unhooked to or from the hooks 9 the parts being arranged and adapted to operate substantially as and for the purposes herein set forth.

In testimony whereof we have signed our names to this specification in the presence of two subscribing witnesses.

T. GUTHRIE.
WM. THOS. HALL.

Witnesses:
A. CRANDALL CHAPMAN,
J. A. HARVEY.